Sept. 1, 1931.  H. H. MERCER  1,821,474
BORING TOOL
Filed Dec. 5, 1927  3 Sheets-Sheet 1
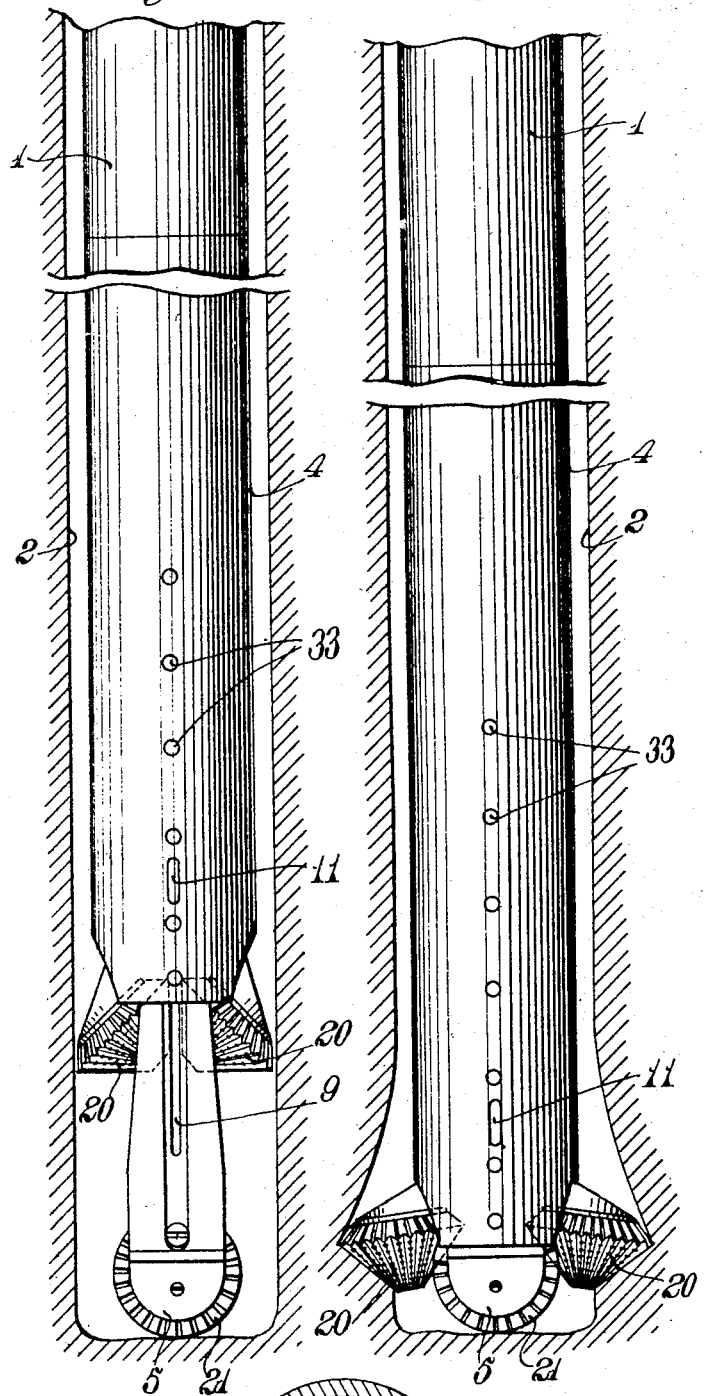
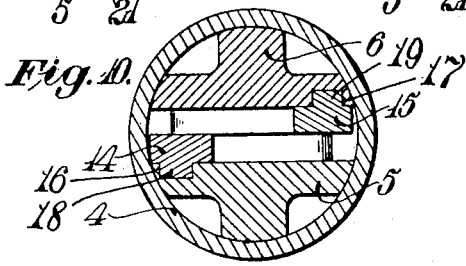
Inventor:
Henry H. Mercer.
by Luis A. Maxson
Atty.

Sept. 1, 1931.  H. H. MERCER  1,821,474
BORING TOOL
Filed Dec. 5, 1927  3 Sheets-Sheet 2
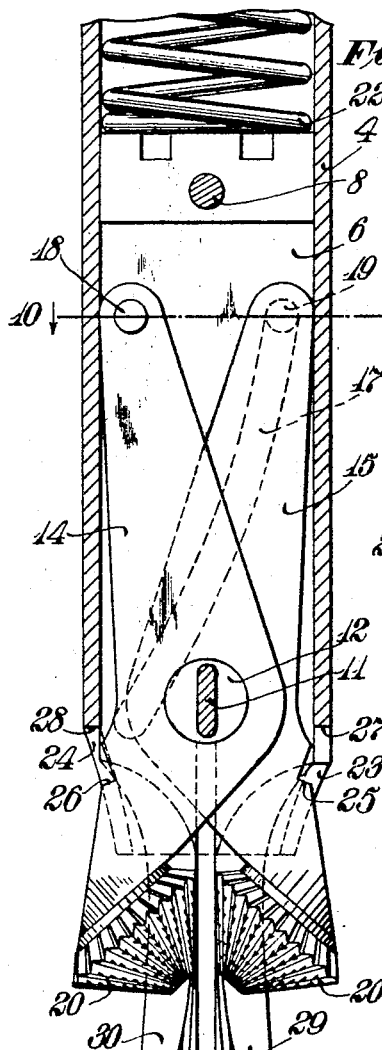
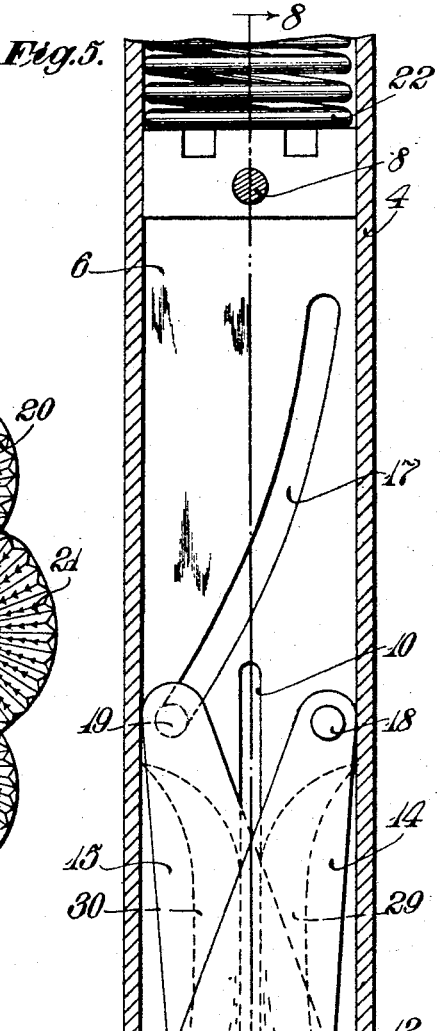
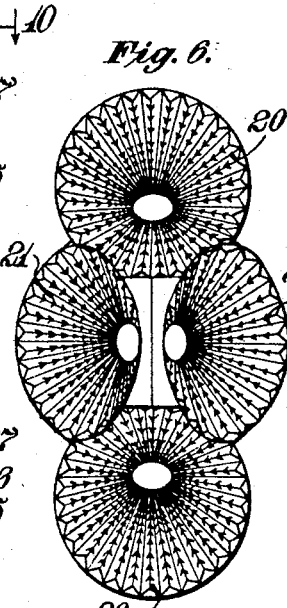
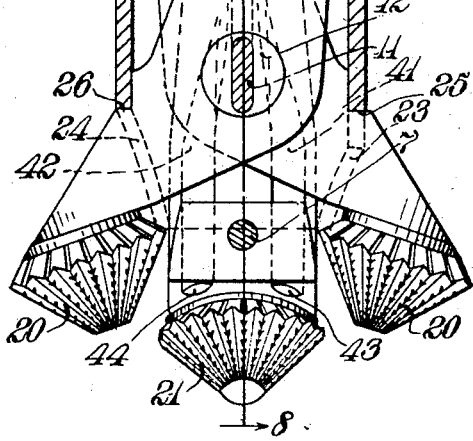
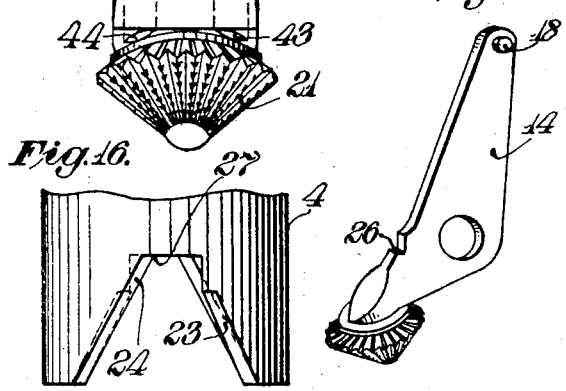
Inventor:
Henry H. Mercer.
by
Louis A. Maxson.
Atty.

Sept. 1, 1931.  H. H. MERCER  1,821,474
BORING TOOL
Filed Dec. 5, 1927   3 Sheets-Sheet 3

Inventor:
Henry H. Mercer.
By Luis A. Maxon.
Atty.

Patented Sept. 1, 1931

1,821,474

UNITED STATES PATENT OFFICE

HENRY H. MERCER, OF CLAREMONT, NEW HAMPSHIRE, ASSIGNOR TO SULLIVAN MACHINERY COMPANY, A CORPORATION OF MASSACHUSETTS

BORING TOOL

Application filed December 5, 1927. Serial No. 237,927.

This invention relates to boring tools of the expanding reamer type and is directed particularly to improvements over an expanding reamer forming the subject matter of my co-pending application Ser. No. 65,019, filed Oct. 26, 1925. It is particularly adapted for use in enlarging a drilled hole to provide a larger space for explosives, although it will be understood that it may be employed in other uses where an expanding reamer is needed.

It is an object of the present invention to provide improved means for effecting operation of the expansion mechanism for the expanding reamer arms. A further object is to provide means for carrying a pair of cutters in addition to those carried by the reamer arms. Other objects are to provide a very much simplified arrangement having also the advantages of rigidity and lower cost of manufacture than the reamer disclosed in my application above referred to. Still other objects and advantages will hereinafter more fully appear.

In the accompanying drawings there is shown for purposes of illustration one form which the invention may assume in practice.

In these drawings,—

Fig. 1 is an elevational view of the boring tool with the reamer arms in contracted position.

Fig. 2 is a similar view showing the reamer arms just after they have been moved to expanding position.

Fig. 3 is also an elevational view of the boring tool in a drilled hole showing the same in the operation of deepening and enlarging the hole.

Fig. 4 is a vertical sectional view of the boring tool showing the reamer arms in contracted position.

Fig. 5 is a view similar to Fig. 4 showing the reamer arms in expanded position.

Fig. 6 is a bottom plan view of the cutters, the two reaming cutters being shown in expanded position.

Fig. 7 is a perspective view of one of the reamer arms and its cutter.

Fig. 10 is a transverse sectional view on the line 10—10 of Fig. 4.

Figure 12:
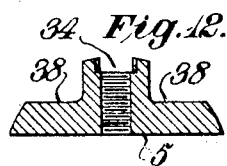
Figure 13:
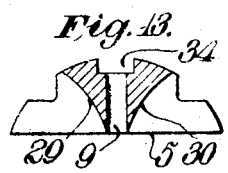
Figure 9:
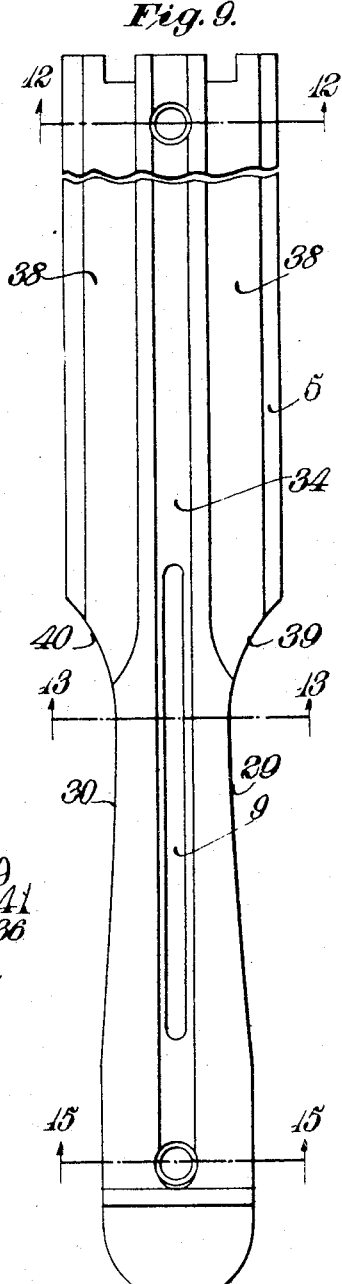
Fig. 9 is an elevation showing the outer curved surface of one of the sliding jaw members.
Figure 11:
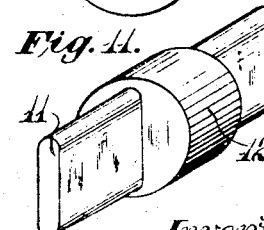
Fig. 11 is a perspective view of the longitudinal key and bearing construction for the pivoted reamer arms.

Figs. 12 and 13 are transverse sectional views of the sliding jaw member on lines 12—12 and 13—13, respectively, of Fig. 9.

Figure 8:
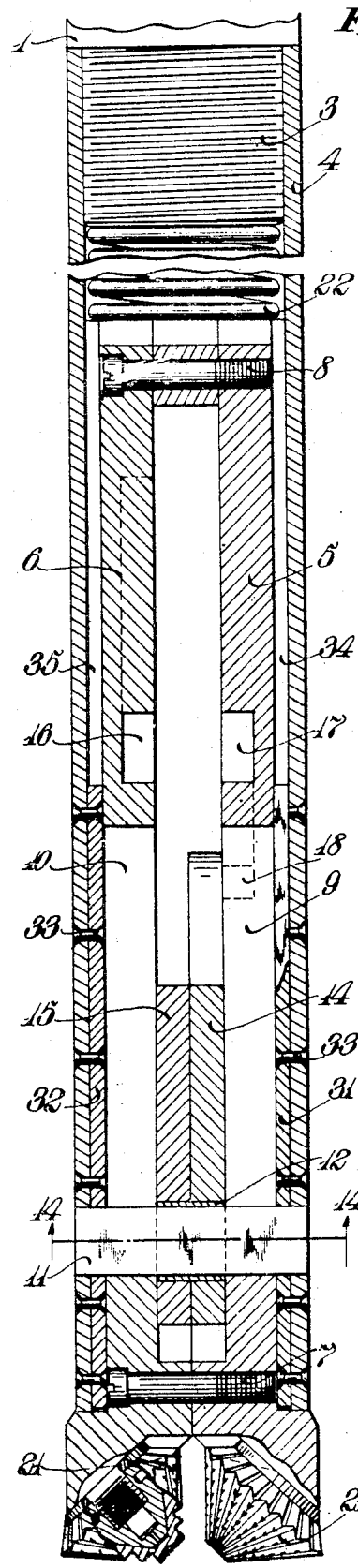
Fig. 8 is a central vertical section taken on the line 8—8 of Fig. 5.
Figure 14:
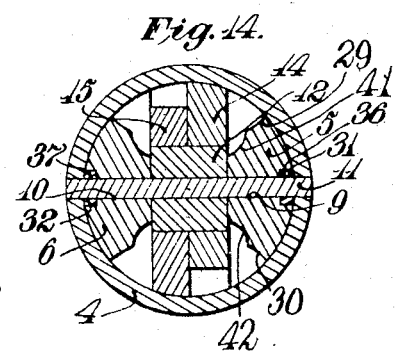

Fig. 14 is a transverse sectional view on the line 14—14 of Fig. 8.

Figure 15:
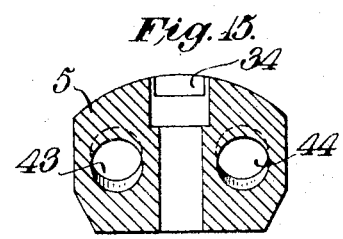

Fig. 15 is also a transverse section through the sliding jaw on the line 15—15 of Fig. 9.

Fig. 16 is a fragmentary elevational view of the lower end of the casing.

In the illustrative embodiment of my invention I have shown a casing 1 extending from the surface of the ground into a drilled hole 2 which has been previously drilled by some suitable apparatus. The casing 1, as appears in Fig. 8, carries on its end a threaded chuck 3 for cooperation with internal threads on the casing 4 of my improved expanding reamer. It will be understood that any suitable type of chuck may be employed as the connection between the casings 1 and 4. The chuck 3 is hollow to provide for the passage of cleansing fluid downwardly therethrough.

My improved expanding reamer mechanism comprises generally a pair of sliding jaws 5 and 6 secured together at each end as by bolts 7 and 8 to form a substantially cylindrical unit adapted to telescopically fit into the bore of the casing 4. Slots 9 and 10 are formed in the sliding jaw members to receive a key 11 secured to the casing 4 to allow a limited amount of telescoping movement between the sliding jaw members and the outer casing. The key 11 has mounted thereon a cylindrical bearing member 12 to receive a plurality of reamer arms 14 and 15 which are adapted to pivot on the member 12 in moving from the collapsed position indicated in Fig. 4 to the expanded position of Fig. 5. The sliding jaw members are spaced apart a sufficient distance to allow the pivoted reamer arms to be received between them, and on their inner opposed surfaces are formed a plurality of cam grooves or slots 16 and 17 adapted to actuate the pivoted reamer arms through cooperation with lugs 18 and 19 carried thereby. The sliding jaw members are identical with each other so that when their flat surfaces are placed together the slots 16 and 17 will extend in opposite directions.

The operation of the mechanism thus far described will be readily apparent. When the casing carrying the reamer mechanism is inserted in a drilled hole, the cutters 21 carried by the sliding jaws will strike the bottom of the hole and the casing carrying the key 11 and bearing member 12 will continue to move downwardly whereby the reamer carrying arms will be moved relative to the sliding jaw members, and this relative movement through the action of the lugs 18 and 19 working in the opposed cam grooves 16 and 17 respectively will cause the reamer arms to move in a scissor-like fashion to the full expanded position shown in Fig. 2. Thereafter the casing carrying the four cutters as one unit will continue to rotate and be fed downwardly, thereby deepening and enlarging the bottom of the hole as illustrated in Fig. 3.

A coiled spring 22 inserted between the chuck 3 and the sliding jaw members normally forces the jaw members into the position illustrated in Fig. 4, whereby the expanding reamers are held in the collapsed position while being inserted in the hole. The bottom end of the casing 4 is suitably notched as at 23, 24 to allow for the swinging movement of the pivoted reamer arms. It will also be noted that these reamer arms are formed with shoulders 25 and 26 adapted to seat against the bottom of the recesses 23 and 24 upon the surfaces 27 and 28 respectively. Each of the sliding jaw members is provided with suitable recesses 29 and 30 to receive the cutters 20 in their collapsed position and throughout their range of movement. In order to provide a better bearing between the casing and the reaming cutters to take the stress of rotation, I have provided a plurality of keys 31 and 32, as best shown in Fig. 8, secured to the casing by any suitable means such as rivets 33. The outer surfaces of the jaw members are provided with keyways 34 and 35 to accommodate the keys throughout their range of movement. These keys are also provided with openings 36 and 37 to receive the ends of the transverse key 11 and thus aid in transmitting the load on the bearing member 12 to the drill casing.

The sliding jaw members are each provided with means for conducting cleansing fluid from the drill casing to a point adjacent the cutters 21 carried by the sliding jaw members. For this purpose the upper end of each of these jaw members is provided with a plurality of longitudinally extending slots 38, as best shown in Figs. 9 and 12. These slots terminate at points 39 and 40 adjacent the recesses 29 and 30, which recesses provide adequate means for conducting the cleansing fluid to a point adjacent the bearing member 12, from which point the fluid is conducted through a plurality of holes 41 and 42 opening just above the cutters 21 at points 43, 44, respectively. It will thus be readily apparent that adequate means is provided for conducting a cleansing fluid such as air or water under pressure through the drill casing and expanding mechanism for the reamer arm to the extreme bottom of the hole where it will be most effective.

The cutters 20 and 21 as illustrated are of a usual conical rotary type generally known in the trade as the Hughes cutter, but it will be understood that any suitable type of cutter may be employed with my improved expanding reamer. One of these cutters is illustrated in section in Fig. 8 and as will be apparent is mounted on a bearing 45 which may be integral with or otherwise secured to the sliding jaw member.

It will now be apparent that I have provided a very simple arrangement for effecting the expansion of a reamer and one which is very rigid and not liable to get out of order easily; also that the cost of manufacture has been materially reduced.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. An earth cutting tool comprising a casing, a unit mounted in the end thereof for limited telescopic movement, a cutter carried by said unit, a plurality of pivoted arms arranged in side by side relation to swing about a common axis and cutters carried thereby, means secured to said casing to provide a relatively fixed bearing for said arms, and means carried by said unit adapted to actuate said arms pivotally about said bearing upon telescopic movement between said unit and said casing.

2. In an earth cutting tool, a casing, a member of generally cylindrical form mounted in the end of said casing for limited telescopic movement, means forming a vertically extending slot in said member, an expanding reamer mechanism having a plurality of reamer carrying arms mounted in overlapping relation in said slot, means carried by said casing to provide a relatively fixed bearing for said arms, and cam mechanism comprising grooves formed in said telescoping member and cooperating projections carried by said arms.

3. In an earth cutting tool, a casing, a plurality of cutter carrying arms carried thereby, a bearing member on which said arms are pivotally mounted and means for pivotally actuating said arms about said bearing comprising an abutment member movable relative to said casing and cam mechanism carried thereby, and a transverse key extending through said bearing member and secured in said casing.

4. In an earth cutting tool, a casing, a unit telescopically mounted therein and carrying a cutter, and transversely movable cutters carried by said casing, a support for said last named cutters comprising a transverse key secured in said casing and a bearing member surrounding said key, and means for transmitting rotary movement between said casing and cutters including longitudinal keys secured to said casing adapted to cooperate with longitudinal recesses in said telescoping unit.

5. An earth cutting tool comprising a casing, a unit mounted in the end thereof for limited telescopic movement, said unit comprising a plurality of sliding jaws and cutters carried thereby, a plurality of pivoted arms mounted between said jaws, a cutter carried by each of said arms, means secured to said casing to provide a bearing for said arms, and means carried by said unit adapted to actuate said pivoted arms upon telescopic movement between said unit and said casing.

6. An earth cutting tool comprising a casing, a plurality of sliding jaw members mounted in said casing for limited telescopic movement, said jaw members having opposed recesses to provide a vertically extending slot therebetween, a pluarlity of pivoted arms arranged in overlapping relation in said slot, a cutter carried by each of said arms, means secured to said casing to provide a bearing for said arms, and means carried by said unit adapted to actuate said pivoted arms upon telescopic movement between said unit and casing.

7. An earth cutting tool comprising a casing, a unit mounted in the end thereof for limited telescopic movement, a plurality of cutters carried by said unit, a plurality of reamer arms pivotally mounted in said casing arranged in side by side relation to swing about a common axis on a relatively fixed pivot, and means carried by said unit adapted to actuate said arms about said pivot upon telescopic movement between said unit and said casing, said means comprising cam mechanism carried by said unit and pivoted arms.

8. An earth cutting tool comprising a casing, an abutment member mounted therein for limited telescopic movement, a plurality of reamer carrying arms mounted in overlapping relation in said casing, a key extending transversely of and secured in said casing, a bearing for said arms mounted on said key, and means carried by said telescoping member for actuating said pivoted arms upon telescopic movement between said member and said casing.

9. In an earth cutting tool, a casing, a member of generally cylindrical form mounted in the end of said casing for limited telescopic movement, means forming a vertically extending recess in said member, an expanding reamer mechanism having a plurality of reamer carrying arms mounted in overlapping relation in said recess, a key extending transversely of and secured in said casing, a bearing for said arms mounted on said key, said member having elongated slots therein through which said key extends, and means carried by said member adapted to actuate said pivoted arms upon movement of said member relatively to said casing.

10. In an earth cutting tool, a casing, a plurality of sliding jaws mounted therein for limited telescopic movement, a plurality of pivoted arms mounted between said jaws, means comprising a transverse key secured in said casing and a bearing member mounted thereon to pivotally connect said arms to said casing, each of said sliding jaws having an elongated slot therein through which said key extends so as to permit limited relative movement between said jaws and key, cam mechanism carried by said sliding jaws and pivoted arms for actuating the latter upon movement of said sliding jaws.

11. In an earth cutting tool, a casing, a plurality of cutter carrying arms pivotally mounted in said casing, means for expanding said arms comprising a bearing member secured in said casing, means for pivotally actuating said arms about said member comprising an abutment member movable relative to said casing, cam mechanism carried thereby, a transverse key extending through said bearing member and secured in said casing, and means on said abutment member cooperating with said key for limiting relative longitudinal movement.

12. In an earth cutting tool, a casing, a member mounted therein for limited longitudinal movement, transversely movable cutters pivotally connected to said casing, a support for said cutters comprising a transverse key secured in said casing and a bearing member surrounding said key, and means for transmitting rotary movement between said casing and cutters through said member comprising means engaging said casing and sliding member to permit longitudinal relative movement but prevent relative rotary movement.

13. In an earth cutting tool, a casing, a plurality of sliding jaws mounted therein for limited relative longitudinal movement, a pair of transversely movable cutters pivotally mounted between said jaws in such a manner that torque may be transmitted from said jaws to said cutters, a support for said last named cutters comprising a transverse key secured in said casing, a bearing member mounted on said key, means for resisting relative rotary movement between said jaws and said casing comprising a longitudinally extending key carried by one of the same and cooperating with a groove in the other, and means for actuating said transversely movable cutters to expanded position upon relative movement between said jaws and casing.

14. In an earth cutting tool comprising a casing, a unit mounted in the end thereof for limited telescopic movement, a cutting element carried by said unit, expanding reamer arms carried by said casing on a relatively fixed pivot, and cam mechanism carried by said unit and said arms for actuating the latter, and yielding means for normally projecting said unit to its forward limit of movement and holding said reamer mechanism in contracted position.

15. An earth cutting tool comprising a casing, a plurality of sliding jaw members mounted in said casing for relative longitudinal movement, earth cutting means carried by said sliding jaws, a plurality of reamer carrying arms pivotally mounted on a relatively fixed pivot in said casing, means carried by said sliding jaws for actuating said arms to expanded position upon relative longitudinal movement between said sliding jaws and casing in one direction, and yielding means for normally urging said sliding jaws in the opposite direction and maintaining said pivoted arms in contracted position.

16. An earth cutting tool comprising a casing, a plurality of sliding jaw members mounted in said casing for relative longitudinal movement, earth cutting means carried by said sliding jaws, a plurality of reamer carrying arms pivotally mounted on a relatively fixed pivot in said casing, means carried by said sliding jaws for actuating said arms to expanded position upon relative longitudinal movement of said sliding jaws inwardly of said casing, and a compression spring mounted in said casing for projecting said sliding jaws outwardly from said casing whereby said reamer arms are held in contracted position while being inserted in a drilled hole.

17. In an earth cutting tool comprising a casing, a unit mounted in the end thereof for limited telescopic movement, a cutting element carried by said unit, expanding reamer arms carried by said casing and arranged in side by side relation on a relatively fixed pivot to swing about a common axis, and cam mechanism carried by said unit and said arms for actuating the latter, and yielding means for normally projecting said unit to its forward limit of movement and holding said reamer mechanism in contracted position.

18. An earth cutting tool comprising a casing, a plurality of sliding jaw members mounted in said casing for relative longitudinal movement, earth cutting means carried by said sliding jaws, a plurality of reamer carrying arms pivotally mounted and arranged in side by side relation on a relatively fixed pivot to swing about a common axis in said casing, means carried by said sliding jaws for actuating said arms to expanded position upon relative longitudinal movement between said sliding jaws and casing in one direction, and yielding means for normally urging said sliding jaws in the opposite direction and maintaining said pivoted arms in contracted position.

19. An earth cutting tool comprising a casing, a plurality of sliding jaw members mounted in said casing for relative longitudinal movement, earth cutting means carried by said sliding jaws, a plurality of reamer carrying arms pivotally mounted and arranged in side by side relation on a relatively fixed pivot to swing about a common axis in said casing, means carried by said sliding jaws for actuating said arms to expanded position upon relative longitudinal movement of said sliding jaws inwardly of said casing, and a compression spring mounted in said casing for projecting said sliding jaws outwardly from said casing whereby said reamer arms are held in contracted position while being inserted in a drilled hole.

In testimony whereof I affix my signature.

HENRY H. MERCER.